(12) United States Patent
Zhu et al.

(10) Patent No.: US 9,794,106 B1
(45) Date of Patent: Oct. 17, 2017

(54) DETECTING APPLICATION STORE RANKING SPAM

(71) Applicant: Google Inc., Mountain View, CA (US)

(72) Inventors: Kaihua Zhu, Sunnyvale, CA (US); Ping Wu, Saratoga, CA (US)

(73) Assignee: GOOGLE INC., Mountain View, CA (US)

( * ) Notice: Subject to any disclaimer, the term of this patent is extended or adjusted under 35 U.S.C. 154(b) by 396 days.

(21) Appl. No.: 13/783,839

(22) Filed: Mar. 4, 2013

(51) Int. Cl.
*G06F 15/173* (2006.01)
*H04L 29/06* (2006.01)
*H04L 12/24* (2006.01)
*H04L 25/03* (2006.01)
*H04L 12/14* (2006.01)

(52) U.S. Cl.
CPC .. *H04L 29/06047* (2013.01); *H04L 25/03184* (2013.01); *H04L 41/5035* (2013.01); *H04L 12/1432* (2013.01)

(58) Field of Classification Search
CPC .............. H04L 65/1063; H04L 65/403; H04L 29/06047; H04N 21/2402; H04N 21/454; G06F 17/30067; G06F 17/30424; G06F 21/552; G06F 21/566
USPC ......................................................... 709/203
See application file for complete search history.

(56) References Cited

U.S. PATENT DOCUMENTS

| 7,594,011 | B2 | 9/2009 | Chandra | |
|---|---|---|---|---|
| 8,510,389 | B1 * | 8/2013 | Gurajada et al. | 709/206 |
| 8,554,640 | B1 * | 10/2013 | Dykstra et al. | 705/26.7 |
| 2008/0172446 | A1 | 7/2008 | Donovan et al. | |
| 2008/0183794 | A1 * | 7/2008 | Georgis et al. | 709/201 |
| 2009/0132689 | A1 * | 5/2009 | Zaltzman et al. | 709/223 |
| 2009/0327688 | A1 * | 12/2009 | Li | G06F 21/554 713/100 |
| 2012/0233695 | A1 * | 9/2012 | Mahaffey | G06F 21/564 726/23 |
| 2012/0289147 | A1 * | 11/2012 | Raleigh et al. | 455/3.06 |
| 2013/0067378 | A1 * | 3/2013 | Au | G06F 11/32 715/771 |
| 2013/0097706 | A1 * | 4/2013 | Titonis | G06F 21/56 726/24 |
| 2013/0122861 | A1 * | 5/2013 | Kim | G06F 21/51 455/410 |

(Continued)

OTHER PUBLICATIONS

"Identifying Spam in the IOS App Store," R. Chandy and H. Gu, WebQuality '12, Apr. 16, 2012, Lyon, France, pp. 56-59.

(Continued)

*Primary Examiner* — Aftab N. Khan
(74) *Attorney, Agent, or Firm* — Morris & Kamlay LLP

(57) ABSTRACT

A server, which may be configured to manage distribution of content to users, may receive content related information associated with a particular user, and analyze the content related information. Such analysis may comprise comparing parameters in the content related information with corresponding predefined parameters in the server for determining acceptable content related activities, and classifying users based on the analysis of the content related information. The content related information may comprise one or more of content usage related data, content download related metrics, or user session related metrics relating to one or more sessions utilized by users in conjunction with use of content managed via the server.

12 Claims, 4 Drawing Sheets

(56) References Cited

U.S. PATENT DOCUMENTS

2014/0096240 A1\* 4/2014 Hay ................... G06F 21/561
　　　　　　　　　　　　　　　　　　　　726/22

OTHER PUBLICATIONS

"Apple May Have Tweaked App Store Ranking Algorithm, Making Downloads Matter Less," http://www.insidemobileapps.com/2011/04/18/apple-app-store-ranking . . . , pp. 1-6.

\* cited by examiner

DETECTING APPLICATION STORE RANKING SPAM

TECHNICAL FIELD

Aspects of the present application relate to electronic devices. More specifically, certain implementations of the present disclosure relate to detecting ranking of undesired or unsolicited content.

BACKGROUND

Various types of electronic devices are commonly used nowadays. In this regard, electronic devices may be used by one or more users, for various purposes, both business and personal. Electronic devices may be mobile or non-mobile, may support communication (wired and/or wireless), and/or may be general or special purpose devices. Examples of electronic devices comprise handheld mobile devices (e.g., cellular phones, smartphones, and/or tablets), computers (e.g., laptops, desktops, and/or servers), and/or other similar devices. In some instances, electronic devices may include applications that may be run in the electronic devices. In this regard, some applications may simply be intended for recreational use (e.g., games), while other applications may be intended for personal or business use (e.g., shopping, purchases, banking, scheduling, navigation, etc.). In some instances, electronic devices may come with pre-installed applications. In other instances, applications may be downloaded (e.g., via the web) and installed in the electronic devices.

Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for detecting ranking of undesired or unsolicited content, substantially as shown in and/or described in connection with at least one of the figures, as set forth more completely in the claims.

These and other advantages, aspects and novel features of the present disclosure, as well as details of illustrated implementation(s) thereof, will be more fully understood from the following description and drawings.

DETAILED DESCRIPTION

Figure 1:
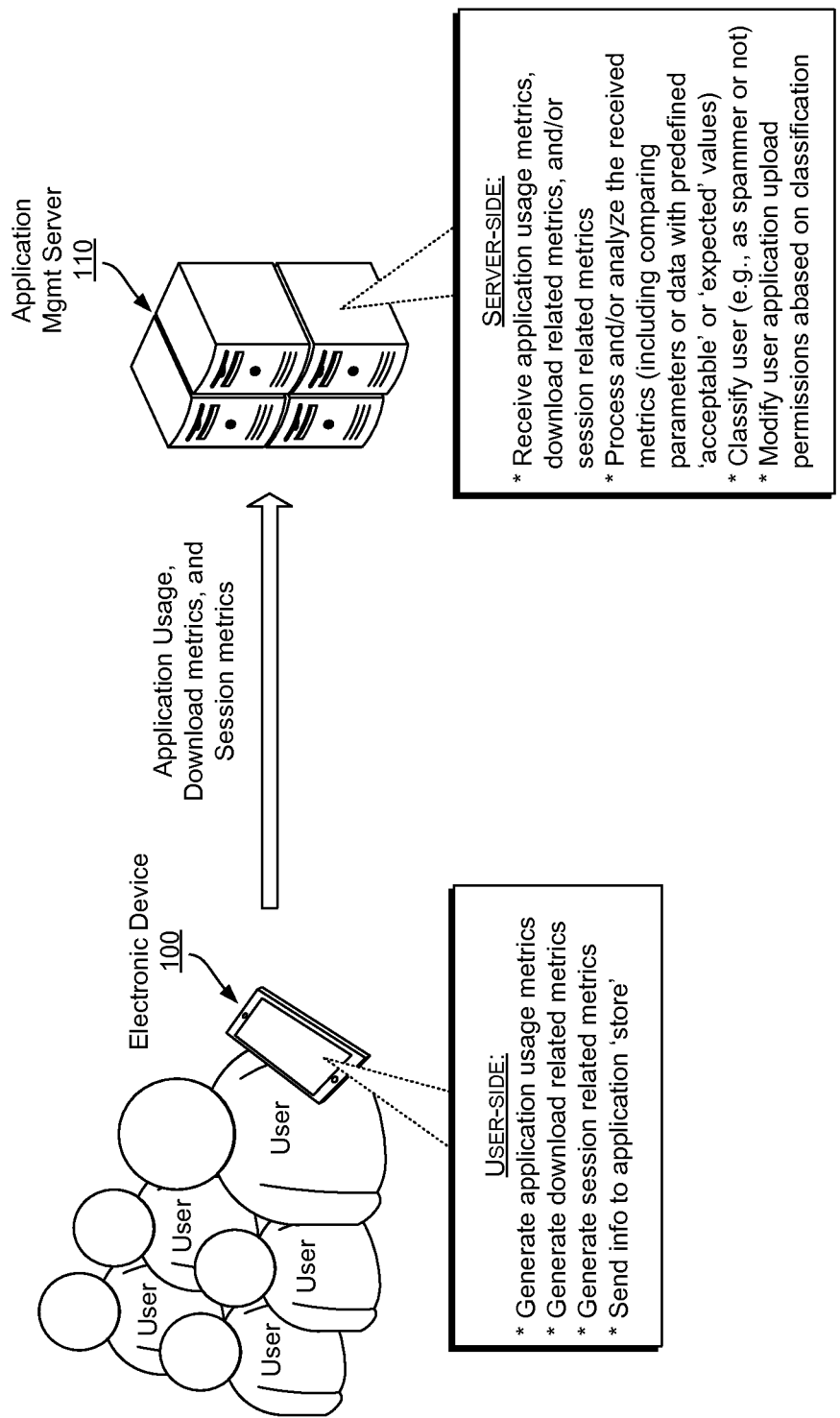
FIG. 1 is a block diagram illustrating interactions between a plurality of user and an application manager to allow for detection of application store ranking undesired or unsolicited content.

The present disclosure relates to a method and system for detecting ranking of undesired or unsolicited content. In various implementations, a server system that manages distribution of content, may receive content related information obtained from a plurality of client devices associated with the server system. In this regard, the content related information may comprise content usage related data associated with plurality of content managed via the server system, where the usage related data comprises one or more types of data relating to use of content; content download related metrics associated with a plurality of content managed via the server system, where the content download related metrics comprises one or more parameters relating to content download activities, and/or user session related metrics relating to one or more sessions utilized by a plurality of users associated with the server system in conjunction with download or use of plurality of content managed via the server system, where the user session related metrics comprises one or more parameters relating to user interaction during download and/or use of content. The server system may analyze the content related information, where the analysis may comprise comparing the content related information with corresponding predefined parameters for determining acceptable content related activity. The server system may classify a user associated with the server system based on the analysis of the content related information. In this regard, the server system may classifying the user based on a comparison of parameters in the content related information corresponding to the user and/or to content originated by the user with one or more of the predefined parameters. The server system may classify the user by, for example, identifying the user as a 'spammer.' In this regard, the server system may rank each of a plurality of content available via the server system. The server system may set or adjust the ranking of at least one of the plurality of content available via the server system based on the analysis of the content related information. The server system may generate the predefined parameters based on an aggregation of metrics received from the plurality of users.

The content usage related data may comprise one or more of: data generated in electronic devices during use of content by the user, market data relating to number of purchases or updates of particular content, and third party data of content use activities. The content download related metrics may comprise information relating to one or more of: a percentage of a particular type of content from all content downloaded by the user, a maximum number of content downloaded in a single day, a total number of content downloaded, and a maximum number of content downloaded in a single week. The user session related metrics may comprise information relating to one or more of: a number of queries issued by the user, an average session duration and/or a delay from search to download, a percentage of content downloaded from search by the user, a percentage of content downloaded from browsing and/or clickthrough, and a percentage of content downloaded from direct inbound traffic.

The present disclosure relates to a method and system for detecting ranking of undesired or unsolicited content. In various implementations, a server system that manages distribution of content, may receive content related information obtained from a plurality of client devices associated with the server system. In this regard, the content related information may comprise content usage related data associated with plurality of content managed via the server system, where the usage related data comprises one or more types of data relating to use of content; content download related metrics associated with a plurality of content managed via the server system, where the content download related metrics comprises one or more parameters relating to content download activities, and/or user session related metrics relating to one or more sessions utilized by a plurality of users associated with the server system in conjunction with download or use of plurality of content managed via the server system, where the user session related metrics comprises one or more parameters relating to user interaction during download and/or use of content. The server system may analyze the content related information, where the analysis may comprise comparing the content related information with corresponding predefined parameters for determining acceptable content related activity. The server system may classify a user associated with the server system based on the analysis of the content related information. In this regard, the server system may classifying the user based on a comparison of parameters in the content related information corresponding to the user and/or to content originated by the user with one or more of the predefined parameters. The server system may classify the user by, for example, identifying the user as a 'spammer.' In this regard, the server system may rank each of a plurality of content available via the server system. The server system may set or adjust the ranking of at least one of the plurality of content available via the server system based on the analysis of the content related information. The server system may generate the predefined parameters based on an aggregation of metrics received from the plurality of users.

The content usage related data may comprise one or more of: data generated in electronic devices during use of content by the user, market data relating to number of purchases or updates of particular content, and third party data of content use activities. The content download related metrics may comprise information relating to one or more of: a percentage of a particular type of content from all content downloaded by the user, a maximum number of content downloaded in a single day, a total number of content downloaded, and a maximum number of content downloaded in a single week. The user session related metrics may comprise information relating to one or more of: a number of queries issued by the user, an average session duration and/or a delay from search to download, a percentage of content downloaded from search by the user, a percentage of content downloaded from browsing and/or clickthrough, and a percentage of content downloaded from direct inbound traffic.

As utilized herein the terms "circuits" and "circuitry" refer to physical electronic components (i.e., hardware). As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be performed by one or more circuits. As utilized herein, the term "e.g.," introduces a list of one or more non-limiting examples, instances, or illustrations. As utilized herein, the term 'server' may refer to a plurality of machines, at least some of which may be installed in different locations, and each of which may be utilized to implement distinct and/or redundant functions associated with operations attributed to and/or performed by the server.

FIG. 1 is a block diagram illustrating interactions between a plurality of user and an application manager to allow for detection of application store ranking undesired or unsolicited content. Referring to FIG. 1 there is shown an electronic device 100 and an application management server 110.

The electronic device 100 may comprise suitable circuitry, interfaces, logic, and/or code for performing functions or operations, and/or for running applications and/or programs. In this regard, operations, functions, applications and/or programs supported by the electronic device 100 may be performed, executed and/or run based on user instructions and/or pre-configured instructions. Accordingly, the electronic device 100 may comprise components or subsystems for enabling interactions with users, such as to obtain user input and/or to provide user output. In some instances, the electronic device 100 may support communication of data, such as via wired and/or wireless connections, in accordance with one or more supported wireless and/or wired protocols or standards. In some instances, the electronic device 100 may be a handheld mobile device—i.e., be intended for use on the move and/or at different locations. In this regard, the electronic device 100 may be designed and/or configured to allow for ease of movement, such as to allow it to be readily moved while being held by the user as the user moves, and the electronic device 100 may be configured to perform at least some of the operations, functions, applications and/or programs supported by the device on the move. Examples of electronic devices comprise handheld mobile devices (e.g., cellular phones, smartphones, and tablets), personal computers (e.g., laptops or desktops), servers, and/or other similar devices. The disclosure, however, is not limited to any particular type of electronic devices.

The application management server 110 may comprise suitable circuitry, interfaces, logic, and/or code for centrally managing applications that may be made available (e.g., for download and/or distribution) to electronic devices, such as the electronic device 100. In this regard, the application management server 110 may be associated with an entity offering applications for download (free or by-purchase) to the electronic device 100. Such entities may comprise physical entities and/or logical entities. Examples of entities offering applications for download may comprise online application stores, content or service providers, and the like. The disclosure, however, is not limited to any particular type of application offering entity. The application management server 110 may comprise a dedicated processing system or general purpose system that is configured for use as centralized application manager (e.g., a dedicated server or a PC programmed to provide the application management functions described in this disclosure). In some instances, an application manager 'server' may actually comprise a plurality of machines, at least some of which may be installed in different locations, and each of which may be utilized to implement distinct or redundant functions associated with application management operations as described in the present disclosure.

In operation, the electronic device 100 may be used to run or execute various functions, programs and/or applications, such as based on pre-configured instructions and/or real-time user instructions or interactions. In this regard, various types of functions, programs and/or applications may be available in the electronic device 100. For example, some functions, programs and/or applications may be intended for recreational use (e.g., games), while others may be intended for personal use (e.g., shopping, purchases, and banking) or for business/commercial use (e.g., scheduling, and remote access). The functions, programs and/or applications available in the electronic device 100 may require varying amounts of user interactivity—e.g., some may require constant and/or continuous user interaction, such as games, chats, or call applications; while others may only require infrequent user interactions, such as email applications.

In some instances, some of the functions, programs and/or applications available in electronic device 100 may be pre-installed on the device. In other instances, however, functions, programs and/or applications may be obtained and/or installed (e.g., by the user of the device) in the electronic device 100. For example, in some instances, applications may be downloaded (e.g., via Internet connection, over a wired or wireless link) and installed in the electronic device 100. In this regard, applications may be offered for download (for free or by-purchase) by centralized application distributers (e.g., online application stores, content or service providers, and similar entities), using application distribution systems or platforms (e.g., the application management server 110).

In some instances, centralized application distributers may offer applications or other content that may be developed by users. This is particularly the case with the recent rise of such devices as smartphones and tablets, with applications that are configured to run on such devices becoming more and more ubiquitous, and with many centralized application distributers (e.g., online application stores) offering nowadays thousands and millions of applications—some estimates suggesting tens of billions downloads of applications to date. As the application distribution systems (especially for use in mobile devices) grow rapidly, application development has become a very profitable business, drawing large amount of resource from developers and investors. For example, a user of the electronic device 100 may develop applications or content, such as using the electronic device 100 (or another device or system). The user may then attempt to offer and/or provide the developed applications or content to other users, such as users associated with and/or using the application management server 110. In this regard, the user of the electronic device 100 may communicate the developed applications and/or content to the application management server 110, which may in turn avail the applications and/or content to other users associated with it.

In many instances, users are far more likely to discover and download top-ranked applications (in each category), and as such there has been a huge disparity in success (e.g., measured in number of downloads and/or revenue generated therefrom) between developers whose applications make into the top spots and the ones who do not. Therefore, there may be enormous incentive for developers to push their applications into the top spots. While some developers attempt to seek high ranking (and thus success drawn therefrom) by legal and ethical means, other developers attempt to accomplish that using questionable practices. For example, some developers may engage third parties to help boost application rankings, by use of such methods as spamming for example.

Accordingly, in various implementations of the present disclosure, measures and/or mechanisms may be utilized, such as in centralized application and content distribution systems, to detect and/or prevent use of questionable practices, and/or to modify or adjust applications ranking or availability based on any detection of such questionable practices. In this regard, while applications and/or content popularity may inherently be determined by the number of downloads, in various implementations, unsolicited and/or undesired content detection mechanisms for ranking mobile apps may be incorporated into application distribution systems or platforms (e.g., the application management server 110), and/or adjustments may be made to ensure that the 'popularity' associated with offered applications and/or content is not tainted by any detected practices. In other words, application distribution systems or platforms (e.g., in the existing app store) may determine and/or apply adjustments to application rankings that may be derived based on the general popularity rule (e.g., based on a number of downloads).

The ranking adjustments may be determined based on a plurality of factors or considerations. For example, because paid applications and/or content would likely get far less downloads than the free ones, applications and/or content may be ranked separately based on whether they are offered free or for pay. Also, because ranking by total download number may favors "older" applications and/or content over new ones, so that the new ones will never get discovered, the ranking algorithms may be configured to maintain a moving window of particular, fixed duration (e.g., past 20 days), and thus would only consider the downloads happened in that window (period) rather than total number of downloads.

In an implementation, in addition to broad/general adjustments (e.g., based on application being free vs. paid, or old vs. new), other more particular adjustments may be used, which may specifically tailored based on and/or to provide detection of unsolicited and/or undesired content (e.g., spam), and/or correction based thereon, resulting in more spam-resilient applications and/or content ranking. For example, centralized application and content distribution systems may collect and/or obtain information relating to particular application(s) and/or user(s), which may be pertinent to spam (or other questionable practices) detection and/or prevention. In this regard, such information may be utilized in optimizing users and/or activities that are likely to be spam related. The information may comprise, for example, application usage metrics, download related metrics, and/or session related metrics. In this regard, the information may relate to use of applications that may be similar to newly uploaded content or to use of applications previously uploaded by the same user(s); may relate download activities by the user uploading the newly offered content or applications; and/or may relate to actions and/or conduct during users sessions in conjunction with download, use, and/or generation of content or applications. Once the centralized application and content distribution system receives the information (e.g., application usage metrics, download related metrics, and/or session related metrics), the information may be process and/or analyzed. This processing and/or analysis may comprise comparing parameters or data with predefined 'acceptable' or 'expected' values for particular metrics. The user uploading the newly available content or applications may then be classified (e.g., as spammer, or possible spammer, or not). User application upload permissions may then be set or modified based on the classification.

Figure 2:
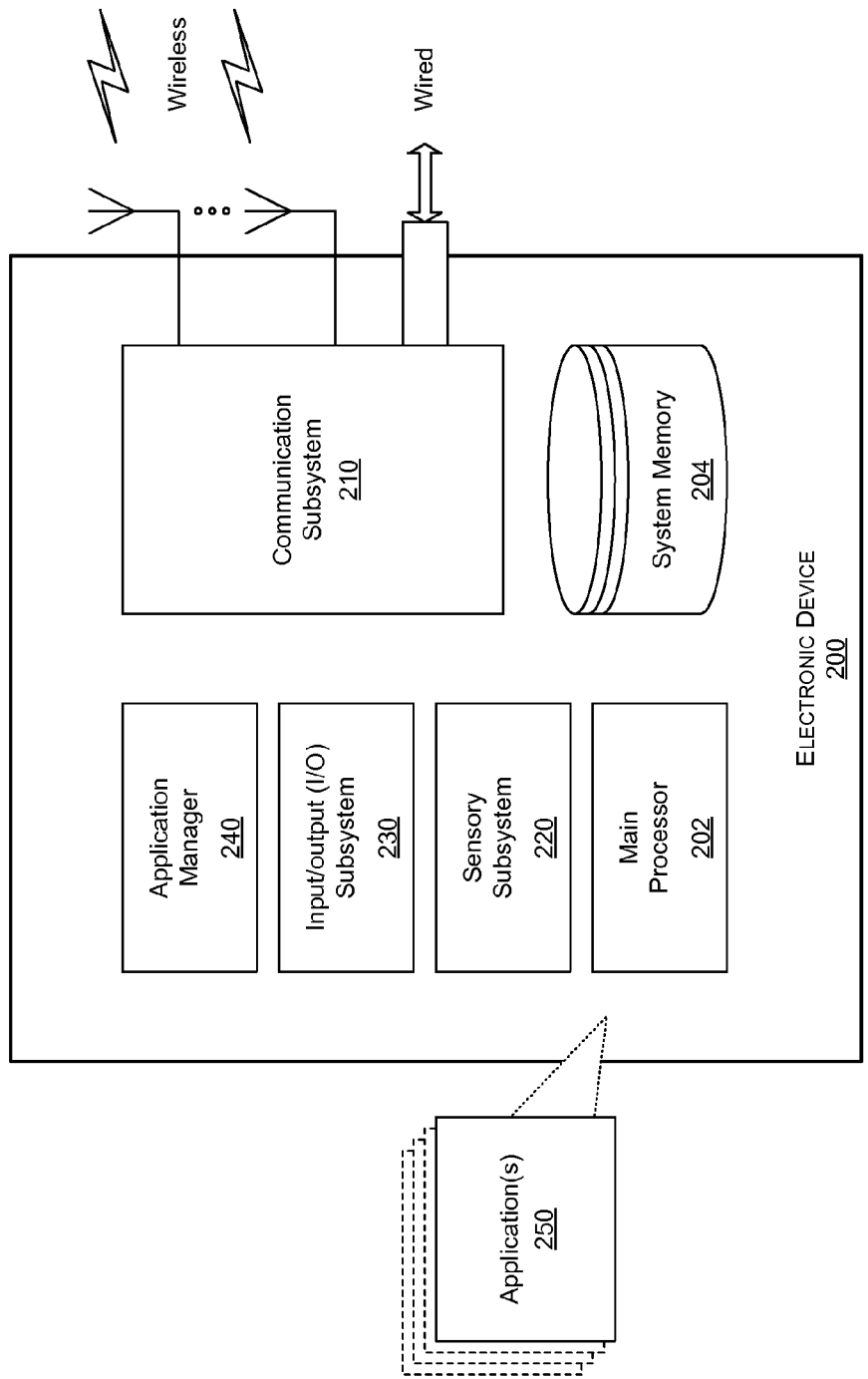
FIG. 2 is a block diagram illustrating an electronic device that may support detection of application store ranking undesired or unsolicited content.

FIG. 2 is a block diagram illustrating an electronic device that may support detection of application store ranking undesired or unsolicited content. Referring to FIG. 2 there is shown an electronic device 200.

The electronic device 200 may comprise suitable circuitry, interfaces, logic, and/or code that may be operable to implement various aspects of the disclosure. In this regard, the electronic device 200 may correspond to the electronic device 100 of FIG. 1, for example. The electronic device 200 may comprise, for example, a main processor 202, a system memory 204, a communication subsystem 210, a sensory subsystem 220, an input/output (I/O) subsystem 230, and an application manager 240.

The main processor 202 may comprise suitable circuitry, interfaces, logic, and/or code that may be operable to process data, and/or control and/or manage operations of the electronic device 200, and/or tasks and/or applications performed therein. In this regard, the main processor 202 may configure and/or control operations of various components and/or subsystems of the electronic device 200, by utilizing, for example, one or more control signals. The main processor 202 may enable running and/or execution of applications, programs and/or code, which may be stored, for example, in the system memory 204. Alternatively, one or more dedicated application processors may be utilized for running and/or executing applications (or programs) in the electronic device 200.

The system memory 204 may comprise suitable circuitry, interfaces, logic, and/or code that may enable permanent and/or non-permanent storage, buffering, and/or fetching of data, code and/or other information, which may be used, consumed, and/or processed. In this regard, the system memory 204 may comprise different memory technologies, including, for example, read-only memory (ROM), random access memory (RAM), Flash memory, solid-state drive (SSD), and/or field-programmable gate array (FPGA). The system memory 204 may store, for example, configuration data, which may comprise parameters and/or code, comprising software and/or firmware.

The communication subsystem 210 may comprise suitable circuitry, interfaces, logic, and/or code operable to communicate data from and/or to the electronic device, such as via one or more wired and/or wireless connections. The communication subsystem 210 may be configured to support one or more wired protocols and/or interfaces, and/or one or more wireless protocols and/or interfaces, facilitating transmission and/or reception of signals to and/or from the electronic device 200 and/or processing of transmitted or received signals in accordance with applicable wired or wireless protocols. Examples of wireless protocols or standards that may be supported and/or used by the communication subsystem 210 comprise wireless personal area network (WPAN) protocols, such as Bluetooth (IEEE 802.15); near field communication (NFC) standards; wireless local area network (WLAN) protocols, such as WiFi (IEEE 802.11); cellular standards, such as 2G/2G+(e.g., GSM/GPRS/EDGE, and IS-95 or cdmaOne) and/or 3G/3G+(e.g., CDMA2000, UMTS, and HSPA); 4G standards, such as WiMAX (IEEE 802.16) and LTE; Ultra-Wideband (UWB), and/or the like. Examples of wired protocols and/or interfaces that may be supported and/or used by the communication subsystem 210 comprise Ethernet (IEEE 802.3), Fiber Distributed Data Interface (FDDI), Integrated Services Digital Network (ISDN), and Universal Serial Bus (USB) based interfaces. Examples of signal processing operations that may be performed by the communication subsystem 210 comprise, for example, filtering, amplification, analog-to-digital conversion and/or digital-to-analog conversion, up-conversion/down-conversion of baseband signals, encoding/decoding, encryption/decryption, and/or modulation/demodulation.

The sensory subsystem 220 may comprise suitable circuitry, interfaces, logic, and/or code for obtaining and/or generating sensory information, which may relate to the electronic device 200, its user(s), and/or its environment. For example, the sensory subsystem 308 may comprise positional or locational sensors (e.g., GPS or other GNSS based sensors), ambient conditions (e.g., temperature, humidity, or light) sensors, and/or motion related sensors (e.g., accelerometer, gyroscope, pedometers, and/or altimeters).

The I/O subsystem 230 may comprise suitable circuitry, interfaces, logic, and/or code for enabling and/or managing user interactions with the electronic device 200, such as obtaining input from, and/or to providing output to, the device user(s). The I/O subsystem 230 may support various types of inputs and/or outputs, including, for example, video, audio, and/or text. In this regard, dedicated I/O devices and/or components, external to or integrated within the electronic device 200, may be utilized for inputting and/or outputting data during operations of the I/O subsystem 230. Examples of such dedicated I/O devices may comprise displays, mice, keyboards, touch screens (or touchpads), and the like. In some instances, user input obtained via the I/O subsystem 230, may be used to configure and/or modify various functions of particular components or subsystems of the electronic device 200.

The application manager 240 may comprise suitable circuitry, interfaces, logic, and/or code for managing applications in the electronic device 200.

In operation, the electronic device 200 may be utilized (e.g., by a user) to perform, execute and/or run various applications (250). In this regard, the electronic device 200 may be configured to participate such as based on pre-configured instructions and/or real-time user instructions or interactions. In this regard, some of the applications 250 may be intended for recreational use (e.g., games), while others may be intended for personal use (e.g., shopping, purchases, and banking) or for business/commercial use (e.g., scheduling, and remote access). The application manager 240 may manage and/or control applications 250, and/or use or operations associated therewith, in the electronic device 200. For example, the application manager 240 may maintain access to source code and/or data of available applications, manage launching of applications, and/or handle any user interactions with the applications 250. In this regard, in some instances, utilizing some of the applications 250 may require user interactions, such as via the I/O subsystem 230. Accordingly, applications may have varying degrees of user interactivity—e.g., some may require constant and/or continuous user interaction, such as games, chats, or call applications; while others may only require infrequent user interactions, such as email applications.

Some of the applications 250 available in electronic device 200 may be pre-installed. In other instances, however, applications may be obtained and/or installed (e.g., by a user of the device) in the electronic device 200. For example, in some instances, applications may be downloaded—e.g., using Internet connections, established over wired or wireless connections setup and/or provided by the communication subsystem 210—by the application manager 240, and installed in the electronic device 200 for use therein. In this regard, applications may be obtained (for free or by-purchase) from centralized application distributers, as described with respect to FIG. 1.

In some instances, the electronic device 200 may be utilized (e.g., by a user) in developing applications that may then be offered to other users (e.g., for use in other devices). In this regard, a user of the electronic device 200 may, for example, develop applications using the I/O subsystem 230 (e.g., to write the source code and/or to input or specify pertinent data, such as any video or audio data), and/or using the sensory subsystem 220 (e.g., to obtain any sensory data that may be pertinent to the applications being developed). The application manager 240 may manage application development in the electronic device 200. Once developed, the application may be offered to other users. This may be achieved directly (i.e., user-to-user and/or device-to-device). In some instances, however, developed applications may be offered indirectly, such as through a centralized application distribution system (e.g., through the application management server 110 of FIG. 1). In this regard, the developed application may be uploaded, using the communication subsystem 210 for example, to the centralized application distribution system, which may in turn avail the applications to other users associated with it.

In some instances, centralized application distribution systems that may be utilized in distributing applications developed by users (such as the user of the electronic device 200) may incorporate measures and/or mechanisms for detecting and/or preventing use of such questionable practices with respect to offering of applications (e.g., spamming practices), as described with respect to FIG. 1 for example. In some instances, such measures and/or mechanisms may require information relating to users and/or applications (and devices used in conjunction therewith). The information may relate to use and/or download of applications (i.e., as end user), and/or to development and uploading of applications (i.e., as originating developer). Accordingly, in some instances the electronic device 200 may be configured to obtain, collect, and/or report information relating to applications related functions in the device (download, use, and/or generation), and/or to user(s) of the device, particular with respect to application related activities performed in the device. The collected information may then be communicated to information to the centralized application distribution systems, for use thereby in conjunction with, for example, offering of applications uploaded by users (e.g., in application ranking and/or adjustments thereof). In some instances, the electronic device 200 may collect and/or report the information autonomously. Alternatively, electronic device 200 may do so in response to request(s) received from the centralized application distribution system(s).

Figure 3:
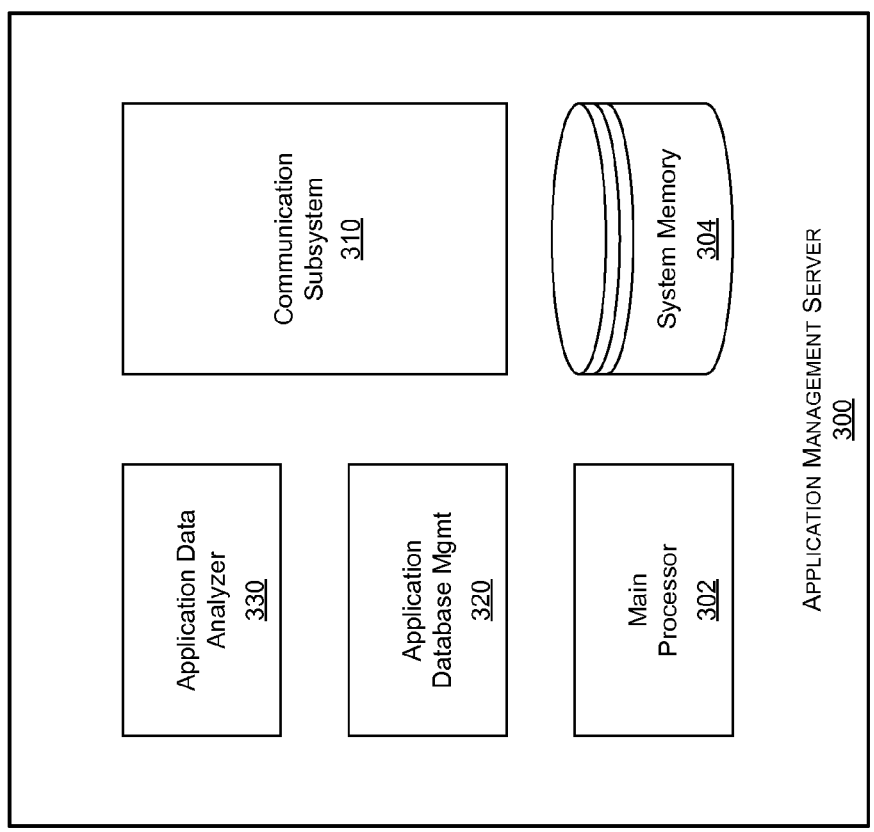
FIG. 3 is a block diagram illustrating an application manager that may support detection of application store ranking undesired or unsolicited content.

FIG. 3 is a block diagram illustrating an application manager that may support detection of application store ranking undesired or unsolicited content. Referring to FIG. 3 there is shown an application management server 300.

The application management server 300 may comprise suitable circuitry, interfaces, logic, and/or code operable to implement various aspects of the disclosure. In this regard, the application management server 300 may correspond to the application management server 110 of FIG. 1, for example. The application management server 300 may comprise, for example, a main processor 302, a system memory 304, a communication subsystem 310, an application database management module 320, an application data analyzer 330, and a recommendation generator 340.

The main processor 302 may comprise suitable circuitry, interfaces, logic, and/or code that may be operable to process data, and/or control and/or manage components, operations or functions of the application management server 300, and/or tasks performed therein. In this regard, the main processor 302 may configure and/or control operations of various components and/or subsystems of the application management server 300, by utilizing, for example, one or more control signals.

The system memory 304 may comprise suitable circuitry, interfaces, logic, and/or code that may enable permanent and/or non-permanent storage, buffering, and/or fetching of data, code and/or other information, which may be used, consumed, and/or processed. In this regard, the system memory 304 may comprise different memory technologies, including, for example, read-only memory (ROM), random access memory (RAM), Flash memory, solid-state drive (SSD), and/or field-programmable gate array (FPGA). The system memory 304 may store, for example, configuration data, which may comprise parameters and/or code, comprising software and/or firmware.

The communication subsystem 310 may be substantially similar to the communication subsystem 210 of FIG. 2 for example. In this regard, the communication subsystem 310 may comprise suitable circuitry, interfaces, logic, and/or code for enabling communicate data or messages from and/or to the application management server 300, via wired and/or wireless connections for example.

The application database management module 320 may comprise suitable circuitry, interfaces, logic, and/or code for managing, controlling, and/or utilizing an application database which may be maintained in the application management server 300. In this regard, the application database may comprise information corresponding to applications that may be made available to a plurality of users (e.g., for download or distribution) through the application management server 300. For example, the application database may comprise a plurality of entries, each corresponding to a particular application, with each entry comprising information pertinent to the associated application. The per-application information may comprise, for example, data relating to classification of user(s) who developed or modified the application. Such classification may comprise, for example, information identifying the user(s) as spammer(s).

The application data analyzer 330 may comprise suitable circuitry, interfaces, logic, and/or code for processing and/or analyzing application related information. In this regard, the application data analyzer 330 may be configured to process or analyze application related information, which may be received by the application management server 300 from clients (e.g., electronic devices).

In operation, the application management server 300 may manage distribution of content (e.g., applications) to a plurality of users. In this regard, the application management server 300 may be configured to provide spam detection in conjunction with distribution of applications that may be developed by users using devices configured to access and/or associate with the application management server 300, substantially as described with respect to FIGS. 1 and 2 for example. In this regard, the application management server 300 may perform spam detection based on metrics pertaining to user and/or applications related activities received from client devices. For example, the application management server 300 may receive, via the communication subsystem 310, from the client device (electronic device 200) actual use metrics and/or cost and resource consumption metrics relating to particular application(s), as described with respect to FIGS. 1 and 2 for example.

The application management server 300 may process and/or analyze, via the application data analyzer 330, the received information, to enable classifying user(s) of client devices (e.g., as 'spammer', 'possible spammer', or 'non-spammers'). In this regard, the application data analyzer 330 may, initially, rank applications in accordance with the general popularity rule (e.g., simply based on number of downloads). Adjustments may then be applied to application rankings as determined based on the general popularity rule. For example, the application data analyzer 330 may be configured to apply broad adjustments that may be applicable to classes or categories of application. In this regard, ranking adjustment may comprise ranking applications separately based on whether they are offered free or for pay since paid applications would likely get less downloads. Also, because ranking by a total download number may favor "older" applications and/or content over new ones, so that the new ones will never get discovered, the application data analyzer 330 may be configured to utilize, in ranking application, a moving temporal window, having a fixed duration (e.g., past 20 days), and thus would only consider the downloads that occurred in that window rather than total number of downloads (to guard against and/or account for the inherent bias against new application resulting from older application being available for longer time than new ones).

In some instances, the application data analyzer 330 may be configured to implement and/or utilize application ranking mechanisms which may be tailored based on information specific to particular applications or users. In this regard, having application-specific and/or user-specific information may enable determining when there are particular pattern that may indicate that a particular user may be engaged in questionable practices (e.g., spam) when it comes to uploading applications to the application management server 300.

For example, with application usage-based ranking and/or spam detection, applications may be ranked based on usage instead of the total download number. In this regard, usage may be far more expensive to generate than download, and thus making the cost of generating application download spam too costly to be sustainable. Accordingly, client devices (e.g., electronic devices, such as device 100) may collect and/or obtain usage related metrics. Examples of usage related metrics may comprise operating system (OS) related metrics and/or other API related information, such as a number of times a particular application starts and how long users use it; market metrics, such as number of times the application gets updated and how many times in-application purchases (as application markets handle the payment); and third party data. In this regard, specialized third party application entities may collect and/or obtain application usage of hundreds of thousands application usage across hundreds of millions of devices, and/or to provide that data. The application management server 300 may initially determine the trustworthiness of the usage related metrics. Once determined trustworthy, the application management server 300 may combine and/or analyze all different usage related information, which allow determining more optimally how an average user would use a particular application (e.g., how much time using the application), and thus the application management server 300 may rank applications (or adjust any existing ranking) accordingly. In addition, the application management server 300 may use the ranking and/or adjustment to ranking in making a determination regarding user classification. For example, a user whose applications are constantly ranked low (such as due to little or no actual use) may be flagged as 'spammer' or 'possible spammer'. In this regard, obtaining the use related metrics for the overall user population may allow calculating usage threshold(s) which would be used (e.g., based on comparison) in determining where usage metrics of a particular user's related application(s) fall (i.e., in comparison to the overall user population), and thus allow for classification of the user.

The download related metrics may also be used in identifying the list of spammers. In this regard, sometime users' download behaviors may be indicative of spamming (e.g., when correlated to particular application(s), which may then be traced back its originator user). For example, the application management server 300 may collect and/or obtain data corresponding to a set of applications that have been installed on a particular device (e.g., the electronic device 200). For each install of each particular application, the application management server 300 may determine the exact time of its occurrence and how often the user updates with the newer application versions. Even such data may be sufficiently indicative of suspicious users and/or devices. The application data analyzer 330 may generate and/or maintain a table containing user based entries (e.g., <user id: application installs>). The table may then be populated with various installation related measurements. Examples of installation related measurements comprise, for example, percentage of downloads corresponding to particular type(s) of applications (e.g., games) as part of the all user apps; maximum number of applications downloaded in a single day; total number of applications downloaded; maximum number of applications downloaded in a single week; and/or average/mean delay from the application release till the user downloads. Metrics corresponding to these measurements may be obtained, collected, and/or generated by the client (electronic) devices, and may then be reported or communicated to the application management server 300 (e.g., upon request). Because the application management server 300 may have large number of users (e.g., millions) for whom measurement data may be obtained, these measurement data may be used to generate a distribution graph (i.e., for all users), which may in turn allow for identifying users whose measurement data fall outside acceptable ranges. For example, in instances where the total measurement distribution may be a Gaussian distribution, a user whose computed probability (as computed from the user's set of measures) may be an outlier of the central portion of the distribution (e.g., beyond the standard variations) may be classified as a 'spammer' or a 'possible spammer'.

In some instances, user sessions used in interactions with the application distribution system (e.g., application management server 300) may be pertinent, and as such data relating to these sessions may be obtained, collected and/or gathered. In this regard, user session data may be relevant in that users' actions (e.g., while downloading or using applications) may be indicative of whether the application(s) may be legitimate or not, which in turn may be useful in classifying the applications' originating users. The application management server 300 may, for example, obtain, collect, or receive data relating to user search queries made through the market search box; links clicked on the market pages; market page user views; time spent on each page; and/or the download event application user (bought) downloaded, installed. In this regard, for each download, a user may normally need to go through a discovery phase in which the user may discover the application. This discovery phase may be performed through, for example, a search, a click-through from a related application detail page, or by directly going to the target application page through an outside link (e.g., ads from ads networks, which may usually generate referrals). For each application downloaded, the application management server 300 may identify the reason why the application is downloaded and may generate a set of user session related metrics corresponding to that download. The application data analyzer 330 may then determine the percentage across the overall user population to identify abnormality. Example of session metrics may pertain to such things as number of queries the user issued during a particular sessions (and/or total query in particular period—e.g., per day); percentage of application downloaded from search; percentage application downloaded from browsing and clickthrough; percentage application downloaded from direct inbound traffic; average session duration; and/or delay from search to download. Accordingly, obtaining user session related metrics for the overall user population may allow for determining applicable expected session related criteria (e.g., threshold(s)), which would in turn be used (e.g., comparison) in determining where session metrics corresponding to particular user's application(s) fall (i.e., in comparison to the overall user population), and thus allow for classification of the user.

Figure 4:
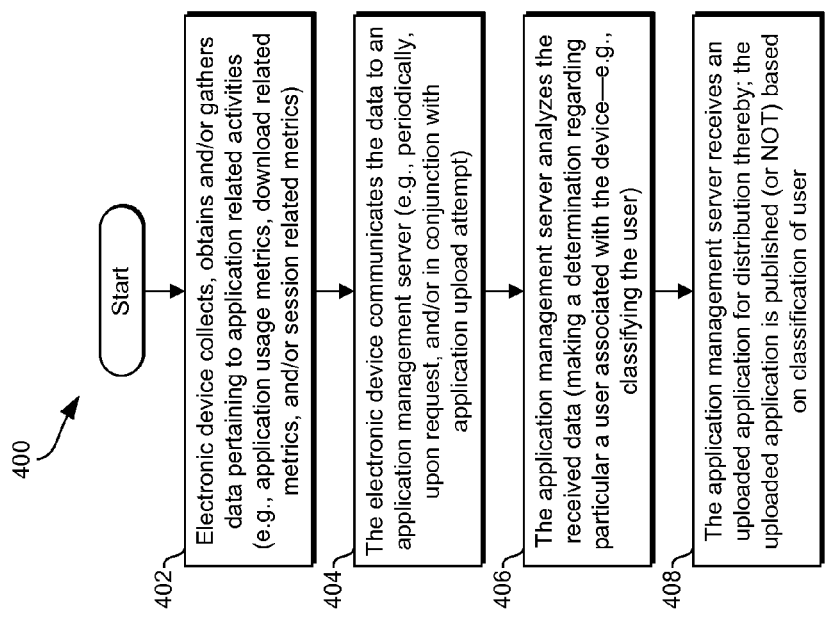
FIG. 4 is a flow chart that illustrates detection of application store ranking undesired or unsolicited content.

FIG. 4 is a flow chart that illustrates detection of application store ranking undesired or unsolicited content. Referring to FIG. 4, there is shown a flow chart 400 comprising a plurality of example steps for detecting spam and/or identifying spammers in a content distribution system (e.g., in application management server 300).

In step 402, an electronic device (e.g., device 200) may obtain, collect, and/or gather information pertaining to application related activities in the device (e.g., application usage metrics, download related metrics, and/or session related metrics). In this regard, the electronic device may obtain, collect, and/or gather the data autonomously, based on user input, and/or in response to request to do so (e.g., from a third party, such as the application management server 300). In step 404, the electronic device may communicate to the information to the application management server (e.g., periodically, upon request, and/or in conjunction with application upload attempt via the electronic device). In step 406, the application management server may process and/or analyze the received information. In this regard, analysis of the received information may comprise and/or entail making a determination regarding a particular user associated with the electronic device—e.g., classifying the user, such as spammer, possible spammer, or non-spammer. In step 408, the application management server may receive an uploaded application for distribution thereby. The server may determine whether to publish (i.e., avail) the uploaded application (or not) based on classification of user. In this regard, the determination may comprise matching the user with previously classified user even if some information is changed (e.g., to trick the server).

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for detecting ranking of undesired or unsolicited content.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method for preventing transmission of an application of limited usefulness, comprising:

receiving, by communications circuitry of a server and from a first electronic device, a first signal, the first signal including information about activities related to a first application, the activities occurring in the first electronic device, the information about the activities related to the first application including information about a duration of time between a search for the first application and a download of the first application, and wherein the information about the activities related to the first application includes information about a percentage of content downloaded in response to a search, information about a percentage of content downloaded in response to a browsing activity, information about a percentage of content downloaded from direct inbound traffic, or any combination thereof;

receiving, by the communications circuitry of the server and from the first electronic device, a second signal, the second signal including a second application;

making, by a processor of the server and based on a comparison of the information about the activities related to the first application with parameters based on information about a plurality of activities related to a plurality of applications received from a plurality of electronic devices, a determination that the second application is the application of limited usefulness; and preventing, by the processor of the server and based on the determination, a third signal from being transmitted to a second electronic device, the third signal including the second application.

2. The method of claim 1, wherein the preventing includes preventing, by the processor of the server, storage of the second application in a database of the server.

3. The method of claim 1, wherein the information about the activities related to the first application includes data generated by the first electronic device during use of content of the first application.

4. The method of claim 1, wherein the information about the activities related to the first application includes data related to updates of content of the first application.

5. The method of claim 1, wherein the information about the activities related to the first application includes information about a number of content of the first application downloaded within a duration of time.

6. The method of claim 1, further comprising:

receiving, by the communications circuitry of the server and from the plurality of electronic devices, the information about the plurality of activities related to the plurality of applications; and generating, by the processor of the server and based on the information about the plurality of activities related to the plurality of applications, the parameters.

7. A system for preventing transmission of an application of limited usefulness, comprising:

communications circuitry of a server configured to receive, from a first electronic device, a first signal and a second signal, the second signal including a second application, the first signal including information about activities related to a first application, the activities occurring in the first electronic device, the information about the activities related to the first application including information about a duration of time between a search for the first application and a download of the first application, and wherein the information about the activities related to the first application includes information about a percentage of content downloaded in response to a search, information about a percentage of content downloaded in response to a browsing activity, information about a percentage of content downloaded from direct inbound traffic, or any combination thereof; and a processor of the server configured to make, based on a comparison of the information about the activities related to the first application with parameters based on information about a plurality of activities related to a plurality of applications received from a plurality of electronic devices, a determination that the second application is the application of limited usefulness, and the server configured to prevent, based on the determination, a third signal from being transmitted to a second electronic device, the third signal including the second application.

8. The system of claim 7, wherein the processor is configured to prevent storage of the second application in a database of the system.

9. The system of claim 7, wherein the information about the activities related to the first application includes data generated by the first electronic device during use of content of the first application.

10. The system of claim 7, wherein the information about the activities related to the first application includes data related to updates of content of the first application.

11. The system of claim 7, wherein the information about the activities related to the first application includes information about a number of content of the first application downloaded within a duration of time.

12. The system of claim 7, wherein:

the communications circuitry is configured to receive, from the plurality of electronic devices, the information about the plurality of activities related to the plurality of applications; and the processor is configured to generate, based on the information about the plurality of activities related to the plurality of applications, the parameters.

\* \* \* \* \*